United States Patent
Wentworth et al.

(10) Patent No.: US 11,913,570 B1
(45) Date of Patent: Feb. 27, 2024

(54) SYSTEM FOR APPLYING TORSIONAL FORCE TO A BURIED PIPE TO FACILITATE EXTRACTION

(71) Applicant: The Charles Machine Works, Inc., Perry, OK (US)

(72) Inventors: Steven W. Wentworth, Scottsdale, AZ (US); Mark D. Randa, Oconomowoc, WI (US); Robert F. Crane, Nekoosa, WI (US)

(73) Assignee: The Charles Machine Works, Inc., Perry, OK (US)

( * ) Notice: Subject to any disclaimer, the term of this patent is extended or adjusted under 35 U.S.C. 154(b) by 347 days.

(21) Appl. No.: 17/335,297

(22) Filed: Jun. 1, 2021

Related U.S. Application Data

(60) Provisional application No. 63/033,476, filed on Jun. 2, 2020.

(51) Int. Cl.
 *F16L 1/06* (2006.01)
 *F16L 1/028* (2006.01)

(52) U.S. Cl.
 CPC ............... *F16L 1/06* (2013.01); *F16L 1/028* (2013.01)

(58) Field of Classification Search
 CPC ............. F16L 1/06; F16L 1/028; F16L 1/036
 See application file for complete search history.

(56) References Cited

U.S. PATENT DOCUMENTS

| | | |
|---|---|---|
| 3,907,253 A | 9/1975 | Schosek |
| 4,003,203 A | 1/1977 | Vural |
| 4,626,134 A | 12/1986 | Coumont |
| 5,205,671 A * | 4/1993 | Handford ............ E21B 19/086 405/184 |
| 5,211,509 A | 5/1993 | Roessler |
| 5,417,290 A | 5/1995 | Barrow |
| 5,549,170 A | 8/1996 | Barrow |
| 6,149,349 A | 11/2000 | Nikiforuk et al. |
| 6,443,657 B1 | 9/2002 | Brahler |
| 7,128,499 B2 | 10/2006 | Wentworth |
| 8,474,795 B2 | 7/2013 | Tjader |
| 10,422,441 B2 | 9/2019 | Olander |
| 2005/0056122 A1 * | 3/2005 | Belik .................. E21B 19/161 81/57.16 |
| 2017/0045175 A1 | 2/2017 | Clarke et al. |
| 2019/0049040 A1 | 2/2019 | Wentworth et al. |
| 2020/0056725 A1 | 2/2020 | Wentworth et al. |

FOREIGN PATENT DOCUMENTS

JP 2000304159 * 11/2000

* cited by examiner

*Primary Examiner* — Sean D Andrish
(74) *Attorney, Agent, or Firm* — Tomlinson McKinstry, P.C.

(57) ABSTRACT

A system for breaking the skin friction between an underground pipe section and the surrounding soil. The system uses a pipe twisting device attached to one end of the pipe section. The pipe twisting device applies a torsional force to the pipe section so as to torsionally deform the pipe section. Such deformation breaks the skin friction between the pipe section and the surrounding soil. After the skin friction is broken along the entire length of the pipe section, an apparatus configured to apply an axial force to the pipe section pulls the pipe section out of the soil.

19 Claims, 18 Drawing Sheets

SYSTEM FOR APPLYING TORSIONAL FORCE TO A BURIED PIPE TO FACILITATE EXTRACTION

RELATED APPLICATION

This application claims the benefit of provisional patent application Ser. No. 63/033,476, authored by Wentworth et al. and filed on Jun. 2, 2020, the entire contents of which are incorporated herein by reference.

BACKGROUND

Underground utility pipelines, such as gas, sewer or water pipes are normally installed within a borehole drilled horizontally beneath the ground surface. Sections of such pipelines periodically need to be extracted and replaced. The pipe section is typically extracted by gripping an exposed end of the buried pipe section and applying a ground-dislodging axial force until the entire pipe section is pulled out of the ground. The ground-dislodging axial force may be applied by any number of apparatuses known in the art, such as a pipe extractor, rotatable drum, or a backhoe, for example.

Prior to removing the pipe section from its borehole, a new section of pipe is attached to an end of the existing pipe section opposite the end engaged with the apparatus applying the ground-dislodging axial force. The new pipe section is pulled into the borehole as the old pipe section is extracted.

The ability of an apparatus to pull an existing pipe section out of the ground is limited by the pipe's tensile yield strength and the friction between the pipe section and the surrounding soil. Long term contact with the soil applies a frictionally induced shear stress on the existing pipe section. The higher the shear stress, the harder it is to extract the pipe section from the surrounding soil. The shear stress varies significantly with soil conditions and soil moisture content. For example, in dry soil, the shear stress may be 12.0 psi, whereas, in wet soil, the shear stress may be 3.0 psi.

The shear stress is the highest before the pipe section starts moving relative to the surrounding soil. Once the initial skin friction between the pipe section and soil is broken, the shear stress applied to the pipe section usually drops significantly. For example, the shear stress may drop between 50% and 75% after the initial skin friction is broken. In the dry soil example, the drag remaining on the pipe section inhibiting extraction may drop from 12.0 psi to 6.0 or even 3.0 psi after the pipe section is initially dislodged from its original bond to the soil.

The skin friction between the pipe section and the soil is traditionally broken axially along the entire length of the pipe section by pulling axially on the pipe section. Such method requires a significant amount of force because the force required to break the skin friction along the entire length of the pipe section must be applied simultaneously. In some cases, the magnitude of force required to axially break the initial skin friction between the pipe section and the surrounding soil cannot be reached before the pipe section experiences tensile failure. In such case, the pipe section cannot be effectively extracted from the soil without breaking.

A need exists to break the initial skin friction between an existing pipe section and the surrounding soil without using a high magnitude of force. The present disclosure is directed to a system for breaking the initial skin friction between the soil and a pipe section in a torsional and progressive manner. Such manner of breaking the initial skin friction uses a modest magnitude of force, rather than the high force magnitude required to axially break the skin friction, as is used by methods known in the art.

SUMMARY

The present disclosure is directed to a system comprising an existing product pipeline having a first end, a second end, and a middle section, in which the middle section is below ground. The system also comprises a pipe twisting device supported at the first end of the product pipeline and configured to apply a torsional force to the product pipeline such that at least a portion of the product pipeline is torsionally deformed.

The present disclosure is also directed to a method of extracting at least a portion of a pipe from an underground environment. The method comprises the step of isolating an elongate segment of the pipe, the segment situated predominantly underground and having a first end exposed to the above-ground environment at a first site, and a second end exposed to the above-ground environment at a second site. The method further comprises the steps of at the first site, applying torsional force to the isolated segment of the pipe, and after or during the foregoing step and at the second site, applying longitudinal force to the isolated segment of pipe until the extent of the exposure of the isolated segment of pipe to the above-ground environment is increased. Alternatively, the torsional force and longitudinal force may be applied at the same site.

DETAILED DESCRIPTION

Figure 1:
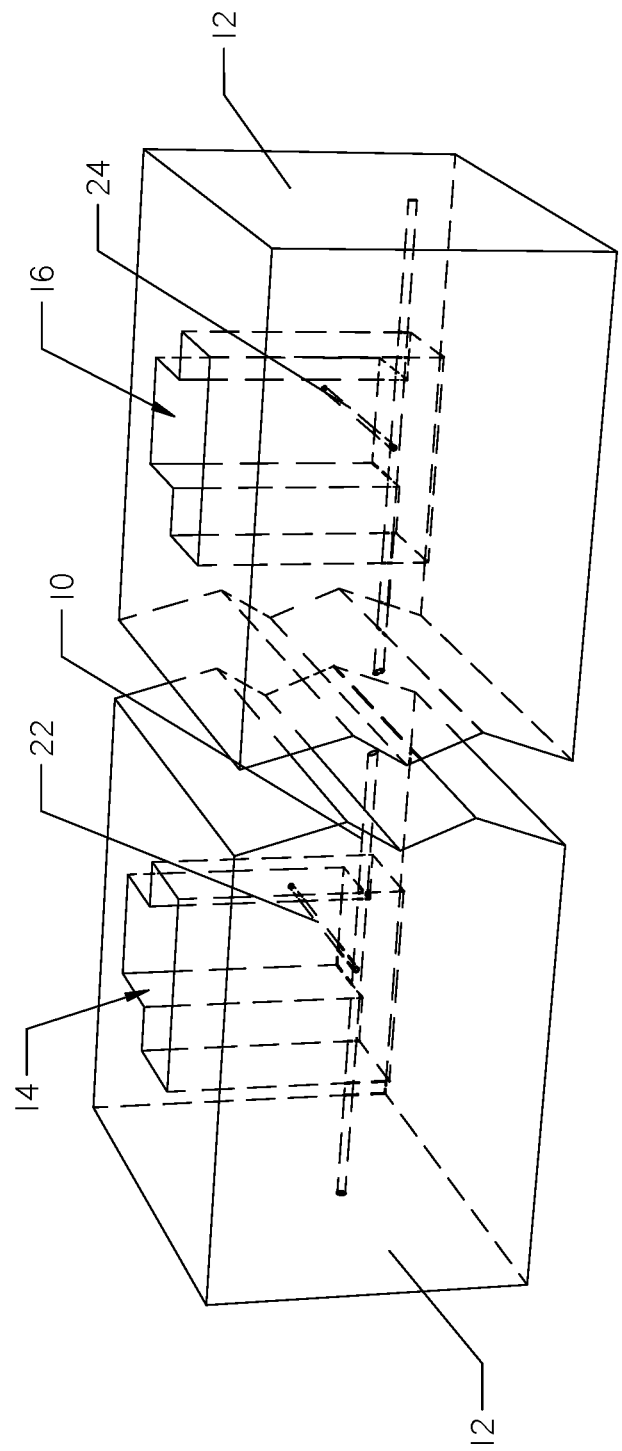
FIG. 1 is an isometric view of an elongate pipe buried beneath the ground surface. The soil surrounding the pipe is shown in a cube-like form. A pair of excavation pits are formed in the soil. Each pit exposes a section of the pipe to the ground surface.

Turning to FIG. 1, an elongate and existing main pipeline 10 is shown installed underground. The pipeline 10 is surrounded by soil 12 and has a length of at least 200 feet. The surrounding soil 12 may include any earth material, such as clay, rock or other materials found under the earth surface. First and second excavation pits 14 and 16 are formed in the soil 12 so as to expose sections of the pipe 10. The pits 14 and 16 also expose a first and second lateral pipe 22 and 24. Each lateral pipe 22 and 24 is connected to the main pipeline 10.

Figure 2:
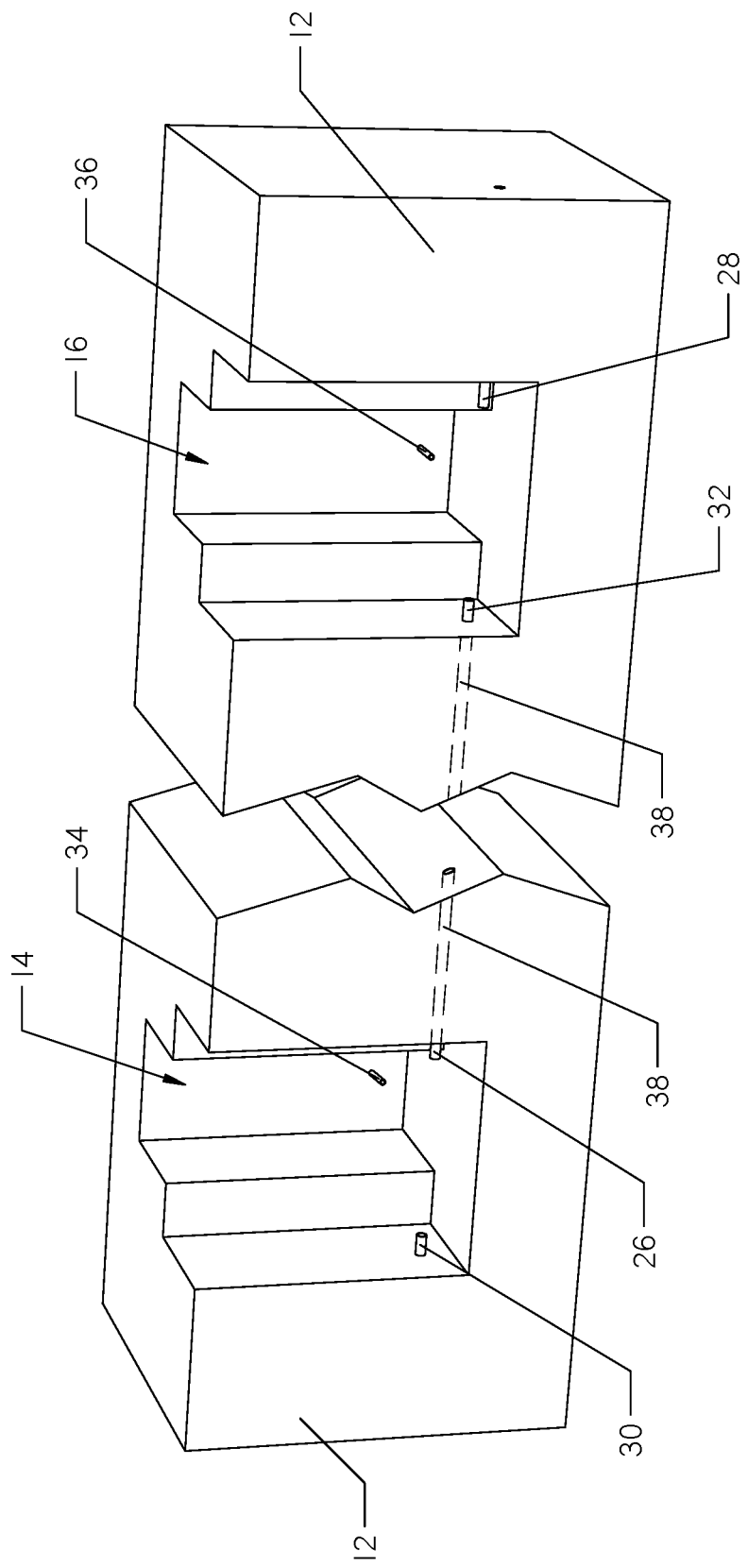
FIG. 2 is a right-side perspective view of the buried pipe and excavation pits shown in FIG. 1. A portion of the ground has been cut away to better view the pits and a segment of the pipe situated within each pit has been cut away to form a pipe section extending between the pits. A portion of the buried pipe section is shown in dotted lines.

Turning to FIG. 2, the pipeline 10 has been cut in the first pit 14 to form a first ground-entering pipe segment having a first free end 26 and a second ground-entering pipe segment having a second free end 30. Likewise, the pipeline 10 has been cut in the second pit 16 to form a first ground-entering pipe segment having a first free end 28 and a second ground-entering pipe segment having a second free end 32. Each lateral pipe 22 and 24, shown in FIG. 1, has also been cut to expose a free end 34 and 36.

The exposed first free end 26 in the first pit 14 is joined to the exposed second free end 32 in the second pit 16. The ends 26 and 32 are joined by a middle pipe section 38 that is surrounded by soil 12. The pipe section 38 is the area of the main pipeline 10 to be extracted and replaced with a new section of pipe. Once the new pipe section is installed, its ends are joined to the free end 30 in the first pit 14 and the free end 28 in the second pit 16. The new pipe section will also be joined to the ends 34 and 36 of the lateral pipes 22 and 24.

Figure 3:
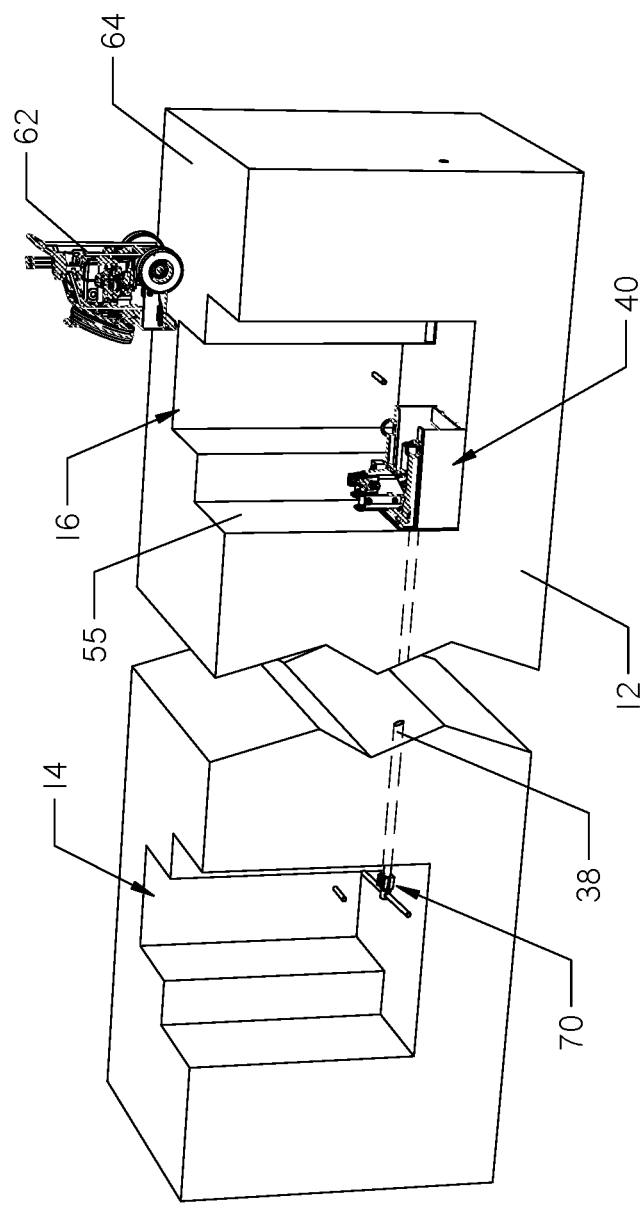
FIG. 3 is the isometric view shown in FIG. 2, but one embodiment of a pipe twisting device is shown engaged with an end of the pipe in the first pit, and a pipe extractor is shown engaged with an end of the pipe in the second pit.

Turning to FIG. 3, an apparatus 40 used to apply a ground-dislodging longitudinal axial force to the pipe section 38 is shown engaged with the second free end 32 of the pipe section 38. The apparatus 40 shown in the figures is a pipe extractor 40. However, the apparatus 40 may comprise any apparatus known in the art capable of pulling the pipe section 38 from the surrounding soil. For example, the apparatus may comprise a rotatable drum. In such embodiment, the pipe section 38 is wound onto the drum as it is pulled from the soil. Alternatively, the apparatus may comprise a backhoe configured to pull axially on the pipe section 38. For ease of illustration, the pipe extractor 40 will be shown as the apparatus used to apply a ground-dislodging axial force in the present disclosure.

Figure 4:
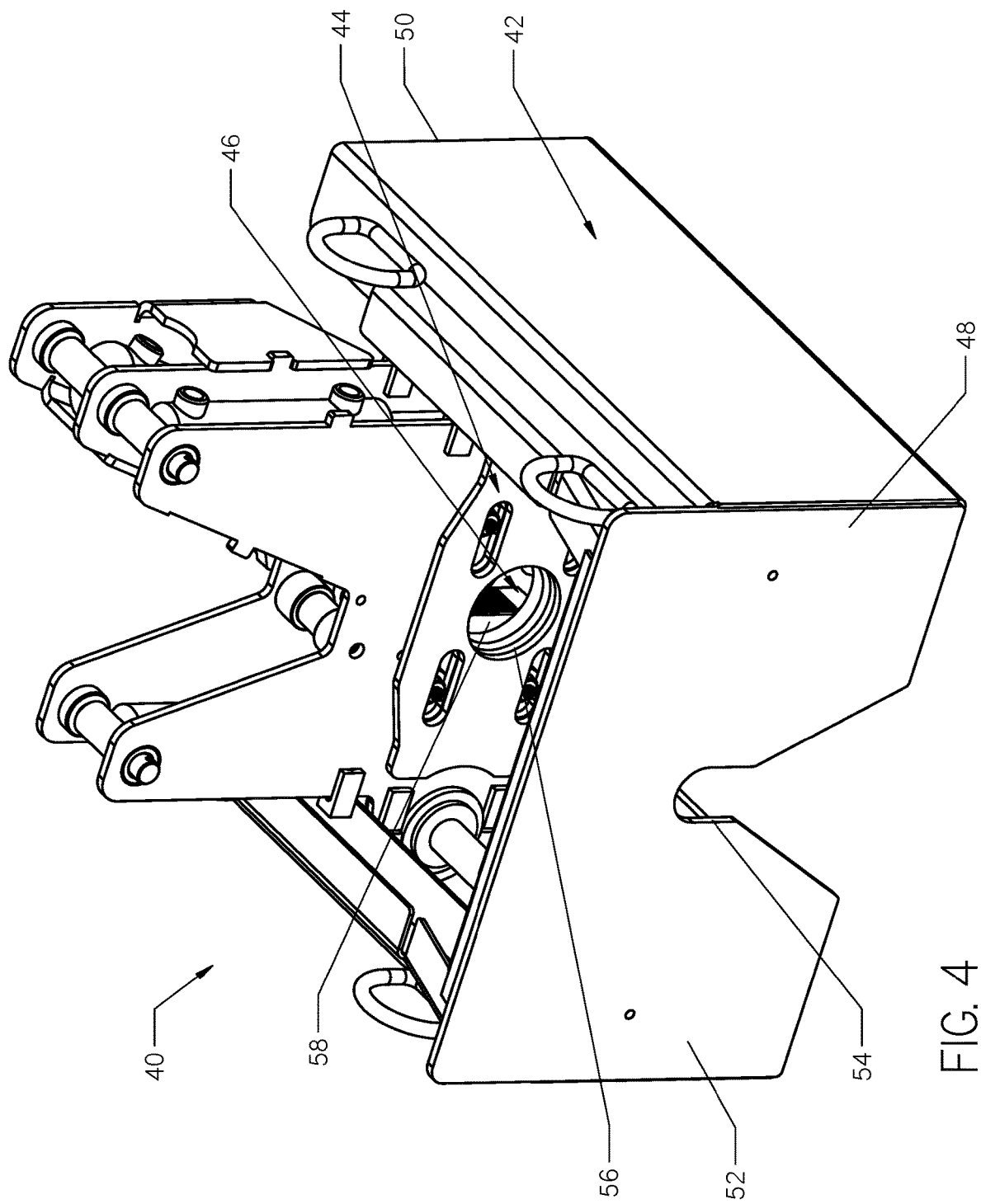
FIG. 4 is a front perspective view of the pipe extractor shown in FIG. 3.

With reference to FIG. 4, the pipe extractor 40 comprises a stationary support structure 42, a carriage 44 movable relative to the support structure 42, and a pipe clamp assembly 46. The carriage 44 is moveable between front and rear ends 48 and 50 of the support structure 42. A reaction plate 52 having a pipe service slot 54 formed therein is positioned at the front end 48.

In operation, the pipe extractor 40 is installed within the second pit 16 so that the reaction plate 52 is engaged with a front wall 55 of the pit 16, as shown in FIG. 3. The reaction plate 52 is also set down over the second free end 32 of the pipe section 38 so that the free end 32 is disposed within the pipe service slot 54.

Continuing with FIG. 4, a pipe throat 56 is formed within the carriage 44. When the pipe extractor 40 is installed within the second pit 16, the second free end 32 of the pipe section 38 passes from the pipe service slot 54 into the pipe throat 56. The pipe clamp assembly 46 comprises a set of pipe clamps 58 positioned adjacent the pipe throat 56. The clamps 58 are configured to move between open and closed positions. When in the closed position, the clamps 58 grip the portion of the free end 32 disposed within the pipe throat 56. Axial movement of the carriage 44 while gripping the free end 32 pulls the pipe section 38 relative to its surrounding soil 12.

Figure 13:
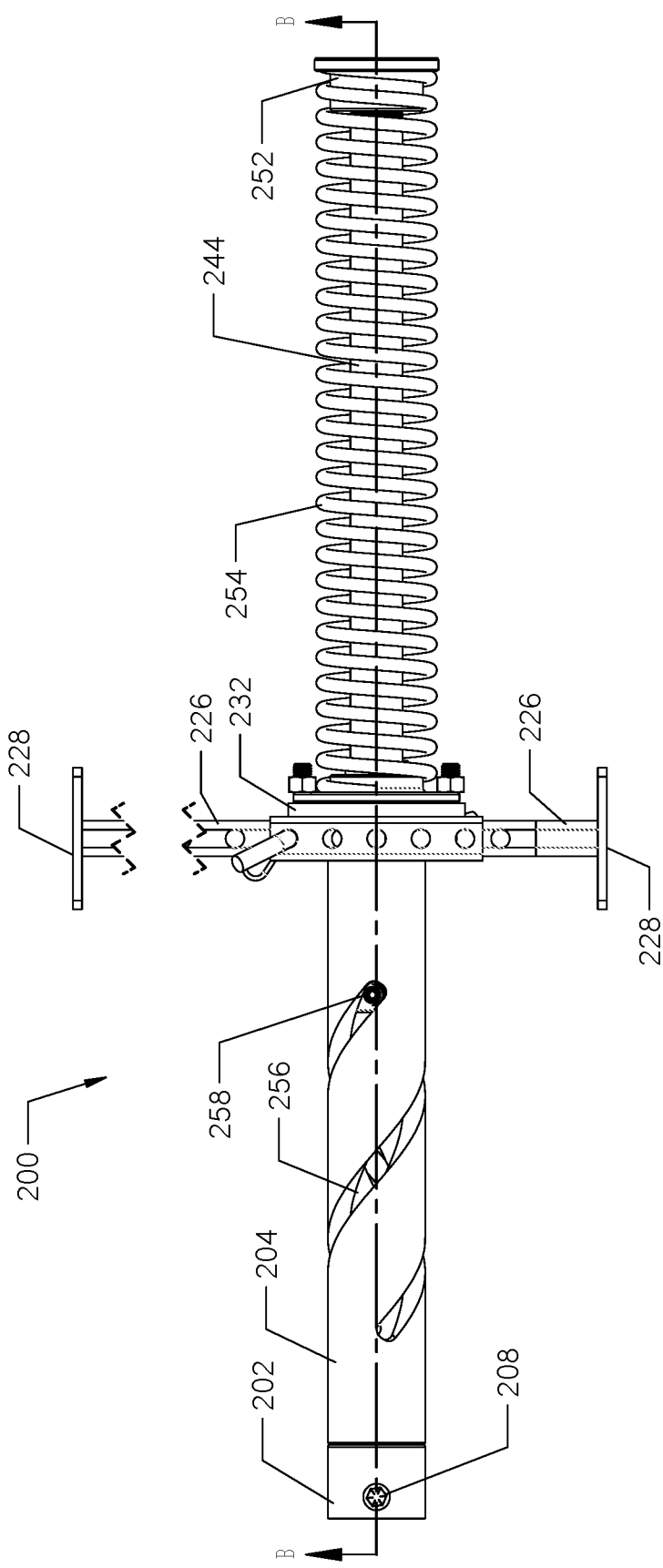
FIG. 13 is a top plan view of the pipe twisting device shown in FIG. 12.

With reference to FIG. 13, a cable 60 may also be threaded through the pipe section 38 and engaged with the pipe extractor 40 at one end and the first free end 26 of the pipe section 38 or a new pipe section to be pulled into the borehole at its opposed end. In operation, the clamp assembly 46 pulls axially on the cable 60 in addition to the pipe section 38.

Turning back to FIG. 3, movement of the carriage 44 and the clamps 58 is powered by a power pack 62 positioned on the ground surface 64 adjacent the second pit 16. The pipe extractor 40 is preferably hydraulically powered. Thus, the power pack 62 preferably comprises a hydraulic pump. A set of hoses (not shown) interconnect the pipe extractor 40 and the power pack 62. The pipe extractor 40 is just one example of a pipe extractor that may be used with the methods described herein. Other configurations of pipe extractors known in the art may also be used.

Continuing with FIG. 3, one embodiment of a pipe twisting device 70 is shown engaged with the first free end 26 of the pipe section 38 in the first pit 14. The pipe twisting device 70 is configured to apply a torsional force to the pipe section 38. Twisting of the pipe section 38 breaks the skin friction between the soil 12 and the pipe section 38 by torsionally deforming the pipe section 38. Torsional deformation of the pipe section 38 moves the outer surface of the pipe section 38 circumferentially relative to the adjacent soil 12 rather than longitudinally. Movement, no matter what direction, of the pipe section 38 relative to the surrounding soil 12 breaks the initial bond between the pipe section 38 and the surrounding soil 12. Thus, breaking the skin friction in a circumferential direction also breaks the skin friction in an axial direction, thereby freeing the pipe section 38 from the surrounding soil 12.

As discussed above, skin friction between the pipe section 38 and the soil 12 is traditionally broken axially along the entire length of the pipe section 38 by pulling axially on the pipe section 38. Such method requires a significant amount of force because the force required to break the skin friction along the entire length of the pipe section 38 must be applied simultaneously.

In contrast, the pipe twisting device 70 breaks skin friction locally across a short length of the pipe section 38. Once skin friction is broken locally, continued twisting of the pipe section 38 causes the skin friction across a subsequent short length of the pipe section 38 to be broken. Further continued twisting of the pipe section 38 breaks skin friction progressively in short distances along the length of the pipe section 38. Applying the tangential force (torque) required to break the skin friction along a short distance is a significantly reduced level of effort and challenge as compared to the axial tensile force required to break skin friction along the entire length of the pipe section 38 simultaneously.

For example, the force required to break the skin friction along the entire length of a 1-inch, 100-foot-long pipe section at once may be in excess of 20,000 pounds. In contrast, the force required to torsionally deform a short length of the same pipe section one full revolution is less than 50 pounds per foot, which is less torque than is required to remove a lug nut from the wheel of a car.

A full revolution of a 1-inch pipe, for example, will produce over 4 inches of pipe skin displacement relative the surrounding soil. Such displacement is more than enough to break a pipe section loose from the surrounding soil. In the above example, application of a torque of less than 50 pounds per foot breaks the skin friction locally over a short distance. Further rotation will continue to break the skin friction over progressive short distances without increasing the amount of torque required to twist the pipe section. Thus, the amount of torque required to continue to twist the pipe section will remain less than 50 pounds per foot. The pipe section will progressively displace from the surrounding soil as it is twisted and torsionally deformed until the entire length of the pipe section is free from the soil. At such point, the axial load required to pull the pipe section from the soil will have dropped approximately 50% to 75%, which will likely be below the tensile strength of the pipe section 38 and a cable 60, if used.

Figure 5:
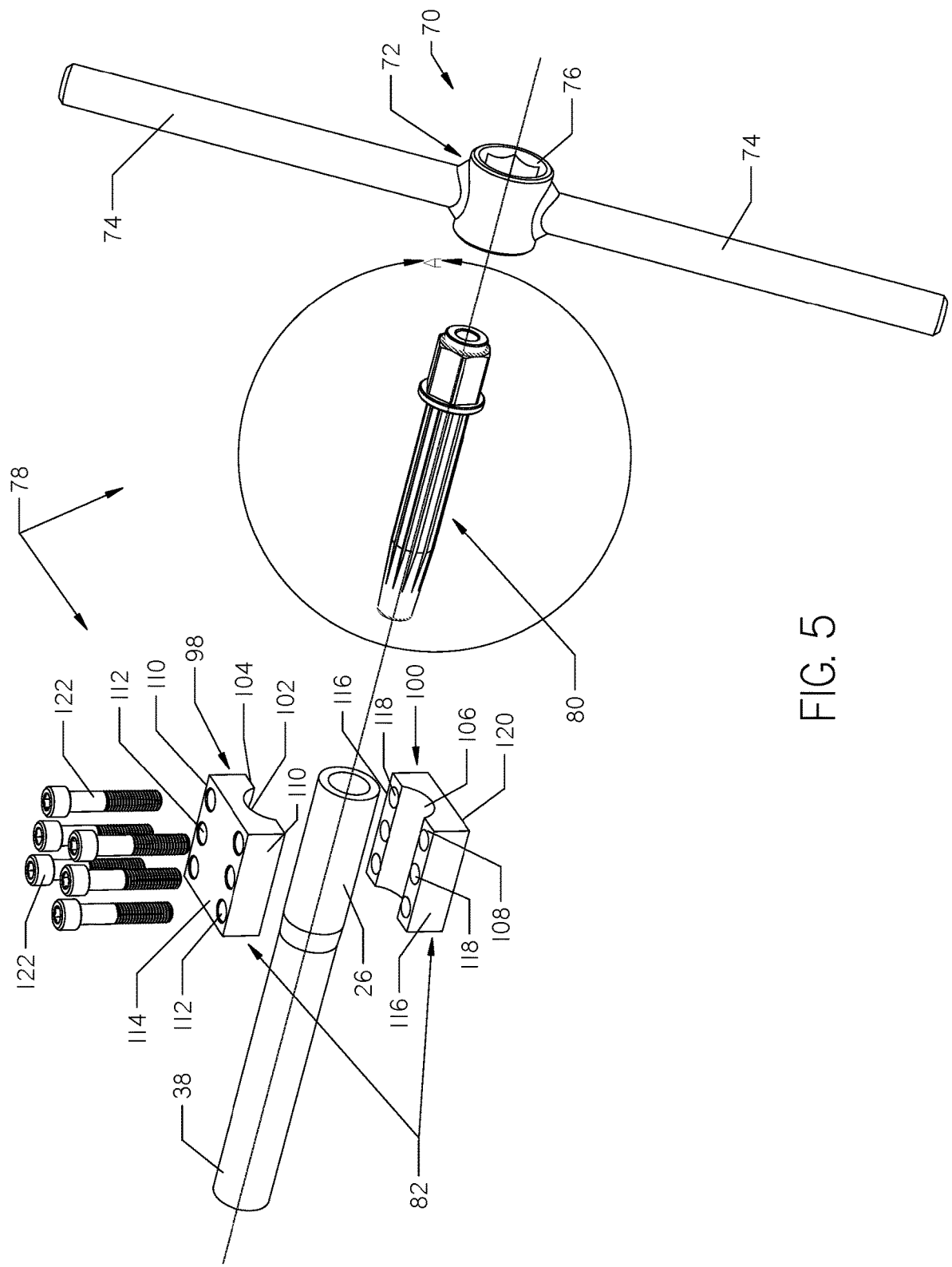
FIG. 5 is a perspective exploded view of the pipe twisting device shown in FIG. 3.

Turning to FIG. 5, the pipe twisting device 70 is a wrench 72. The wrench 72 comprises at least one handle 74 joined to a central coupler 76. Two handles 74 are shown in FIG. 5. In alternative embodiments, more than two handles may be formed on the wrench. The coupler 76 shown in FIG. 5 is a female hex. In alternative embodiments, the coupler may comprise threads or other coupling means known in the art. The wrench 72 is supported on the first free end 26 of the pipe section 38 using a pipe adapter 78.

Figure 6:
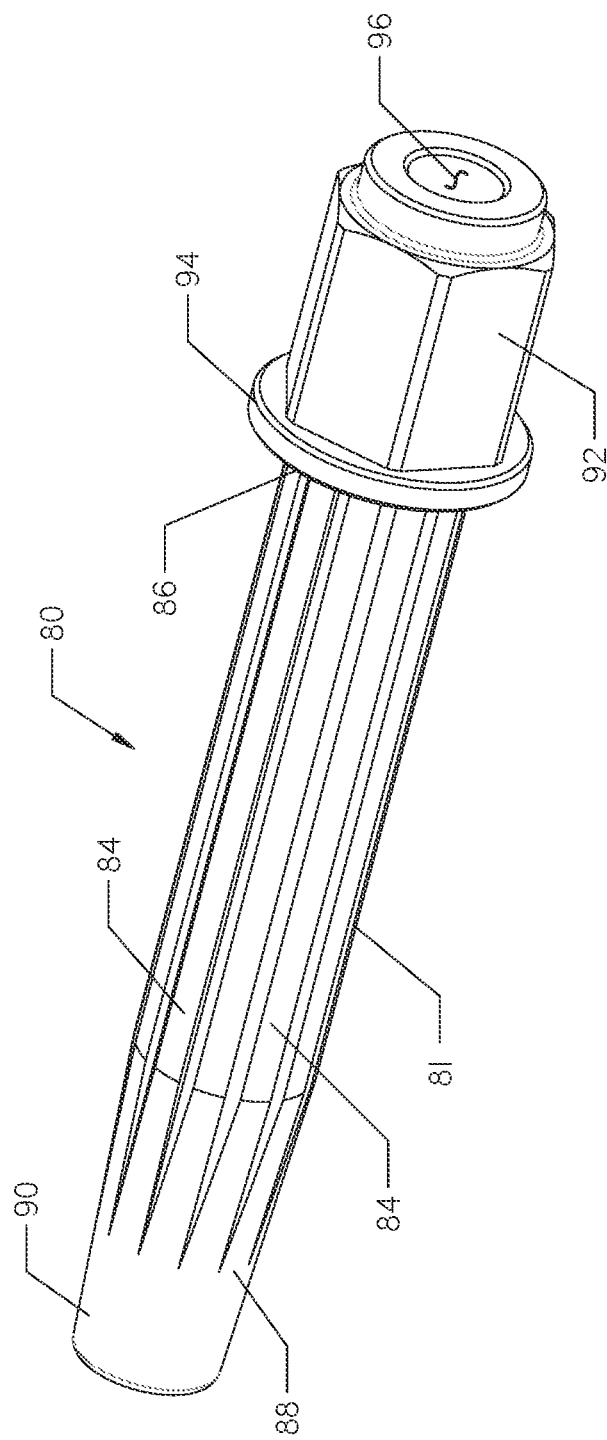
FIG. 6 is an enlarged view of area A shown in FIG. 5.

With reference to FIGS. 5 and 6, the pipe adapter 78 comprises a drive pin 80 and a clamp 82. The drive pin 80 comprises an elongate body 81 having a plurality of splines 84 formed thereon. The splines 84 extend between opposed first and second ends 86 and 88 of the body 81. A tapered nose 90 is formed on the second end 88 of the body 81 and a coupler 92 is supported on the first end 86 of the body 81. The coupler 92 shown in FIGS. 5 and 6 is a male hex. In alternative embodiments, the coupler may comprise threads or other coupling means known in the art.

A flange 94 is interposed between the splines 84 and the coupler 92 at the first end 86 of the body 81. The flange 94 has a greater outer diameter than both the body 81 and the coupler 92. The drive pin 80 further comprises a central bore 96 that interconnects the tapered nose 90 and the coupler 92.

Figure 7:
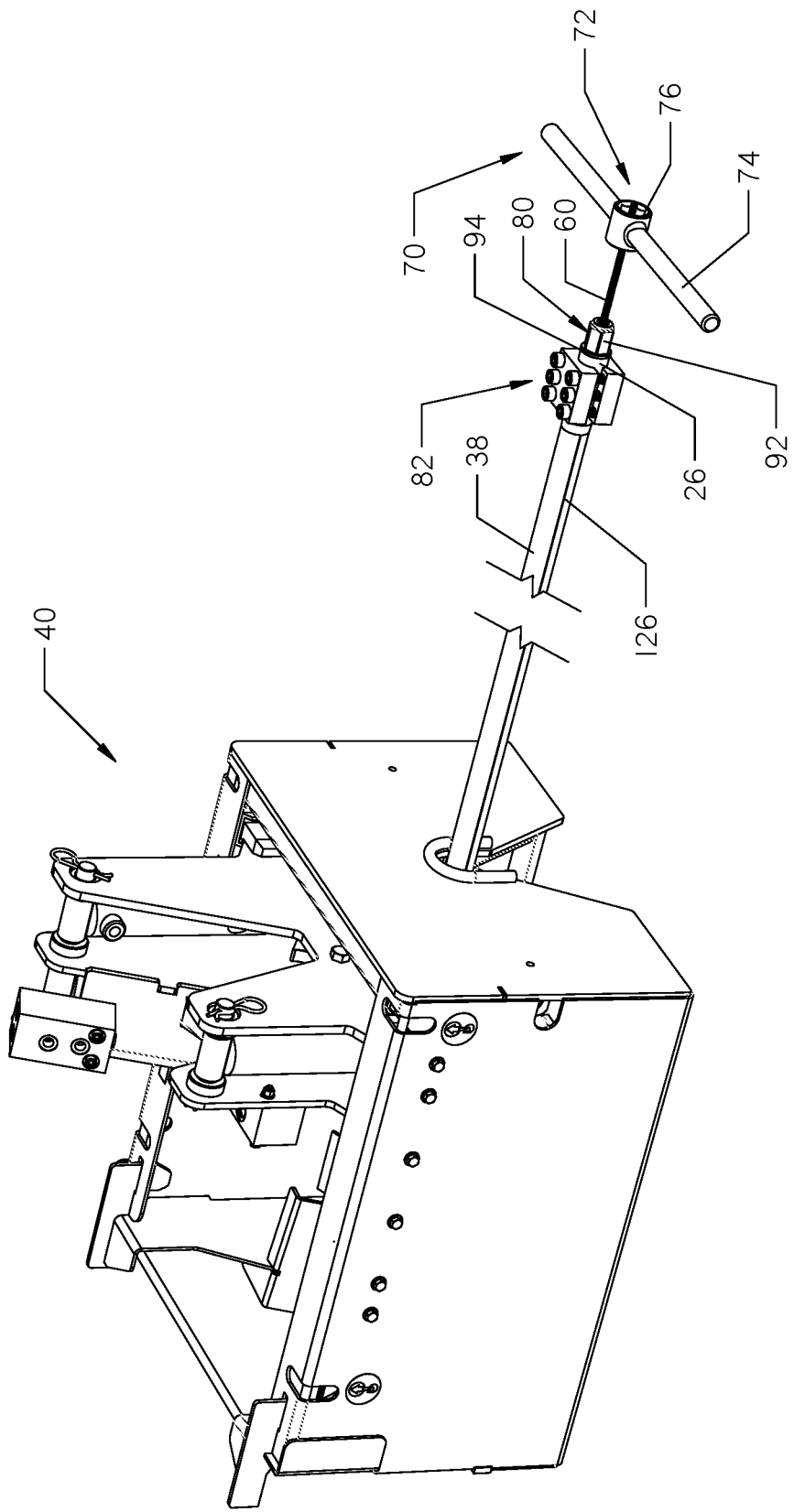
FIG. 7 is a left-side perspective view of the pipe twisting device and pipe extractor shown in FIG. 3, but the soil has been removed. The pipe twisting device and pipe extractor are shown attached to opposite ends of the pipe shown in FIG. 3.

A cable strand 60 disposed through the pipe section 38 may thread through the central bore 96 of the drive pin 80, as shown in FIG. 7.

With reference to FIGS. 5-7, the tapered nose 90 of the drive pin 80 is inserted into the first free end 26 of the pipe section 38. An outer diameter of the body 81 is slightly larger than an outer diameter of the pipe section 38 so that the drive pin 80 frictionally engages and slightly expands the interior of the pipe section 38 when driven into the pipe section 38. Further axial movement of the drive pin 80 into the pipe section 38 is limited by the flange 94. When the drive pin 80 is installed within the pipe section 38, the coupler 92 projects from the first free end 26. The drive pin 80 is further secured to the first free end 26 of the pipe section 38 by the clamp 82.

Continuing with FIG. 5, the clamp 82 comprises an upper jaw 98 and a lower jaw 100. A cylindrical cut-out 102 is formed in a lower surface 104 of the upper jaw 98. A corresponding cylindrical cut-out 106 is formed in an upper surface 108 of the lower jaw 100. The cut-outs 102 and 106 are sized to correspond with an outer surface of the pipe section 38.

The upper jaw 98 includes a pair of sidewalls no running parallel to the cut-out 102. A plurality of openings 112 are formed along the length of each sidewall 110 and interconnect an upper surface 114 and the lower surface 104 of the upper jaw 98. Similarly, the lower jaw 100 includes a pair of sidewalls 116 running parallel to the cut-out 106. A plurality of threaded openings 118 are formed along the length of each sidewall 116 and interconnect the upper surface 108 and a lower surface 120 of the lower jaw 100. The plurality of openings 112 and the plurality of threaded openings 118 align within one another when the jaws 98 and 100 are engaged with the outer surface of the pipe section 38.

The clamp 82 further comprises a plurality of fasteners 122. The fasteners 122 are installed within the aligned openings 112 and threaded openings 116 and are torqued until the jaws 98 and 100 tightly squeeze around the first free end 26 of the pipe section 38 and the drive pin 80. The squeezing action produced by the fasteners 122 cause the ductile pipe end 26 to crush onto the drive pin 80 and mechanically engage the splines 84. The fasteners 112 shown in FIGS. 5 and 7 are socket-headed cap screws. In alternative embodiments, the fasteners may be studs and corresponding nuts, bolts, or other fasteners known in the art. In further alternative embodiments, the lower jaw may have non-threaded openings, if needed, depending on the fastener used.

Figure 8:
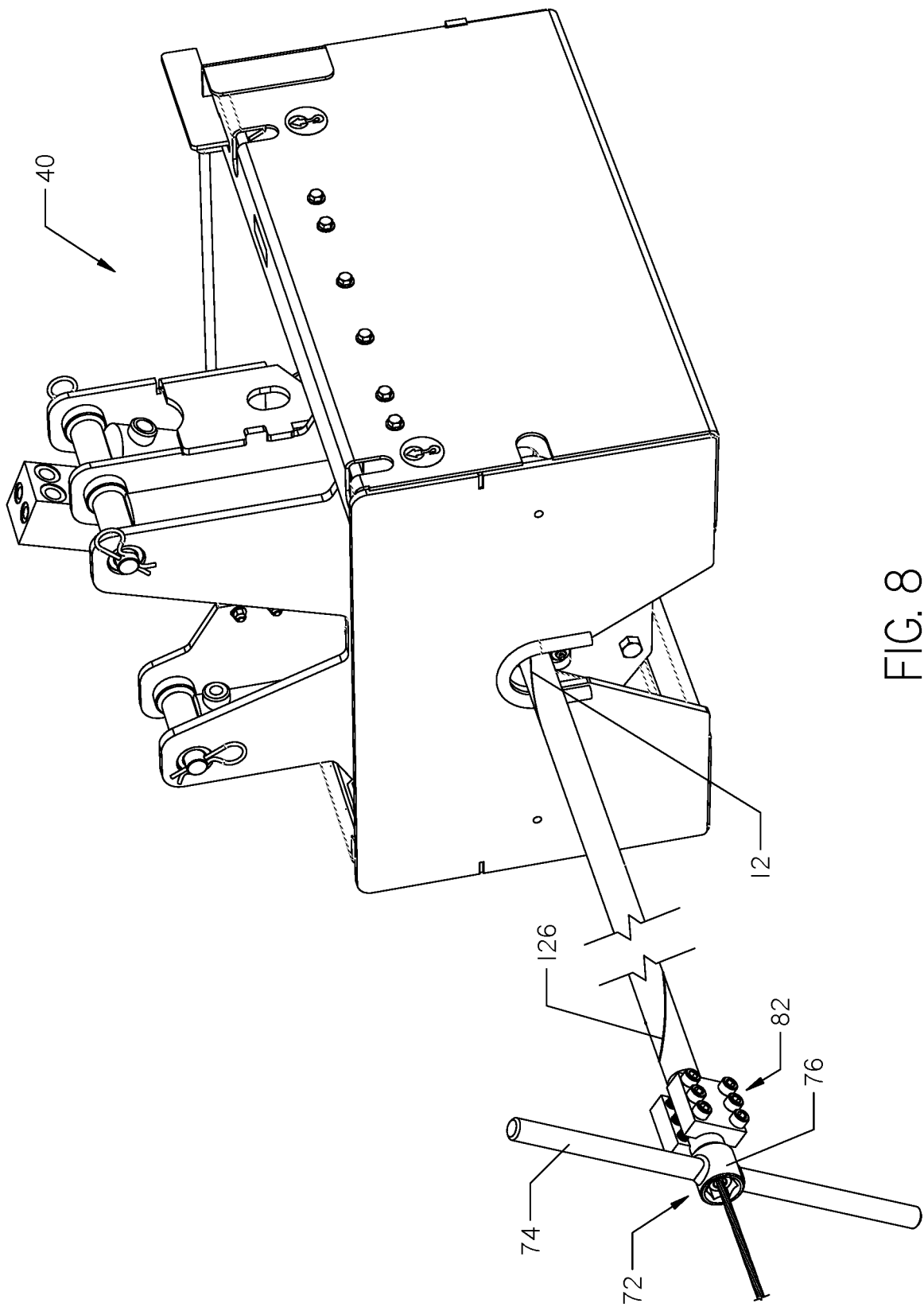
FIG. 8 is a right-side perspective view of the pipe twisting device and pipe extractor shown in FIG. 7, but the pipe is shown in a twisted position.

Continuing with FIGS. 5, 7, and 8, the coupler 76 formed on the wrench 72 is configured to grippingly engage the coupler 92 formed on the drive pin 80. In FIGS. 7, and 8, the male hex of the coupler 92 is installed within the female hex of the coupler 76. In alternative embodiments, the couplers may be threaded or bolted together, for example. When the couplers 92 and 76 are engaged, the cable 60 may pass through the coupler 76 on the wrench 72, as shown in FIG. 8.

Continuing with FIGS. 7 and 8, once the wrench 72 is installed on the drive pin 80, the handles 74 are rotated about a longitudinal axis of the pipe section 38, as shown in FIG. 5. Because the wrench 72 is in gripping engagement with the pipe adapter 78 and thereby the first free end 26 of the pipe section 38, rotation of the handles 74 applies a torsional force to the pipe section 38. Such torsional force causes the pipe section 38 to twist and torsionally deform. Torsional deformation of the pipe section 38 is shown by a comparison of a pipe axis 126 in FIGS. 7 and 8. The pipe axis 126 is linear in FIG. 7 and is twisted in FIG. 8 and has a helical shape. Only a local short distance of the pipe section 38 is initially twisted. As the wrench 72 continues to rotate, short distances along the length of the pipe section 38 consecutively twist, thereby breaking the skin friction in stages along the length of the pipe section 38.

Figure 9:
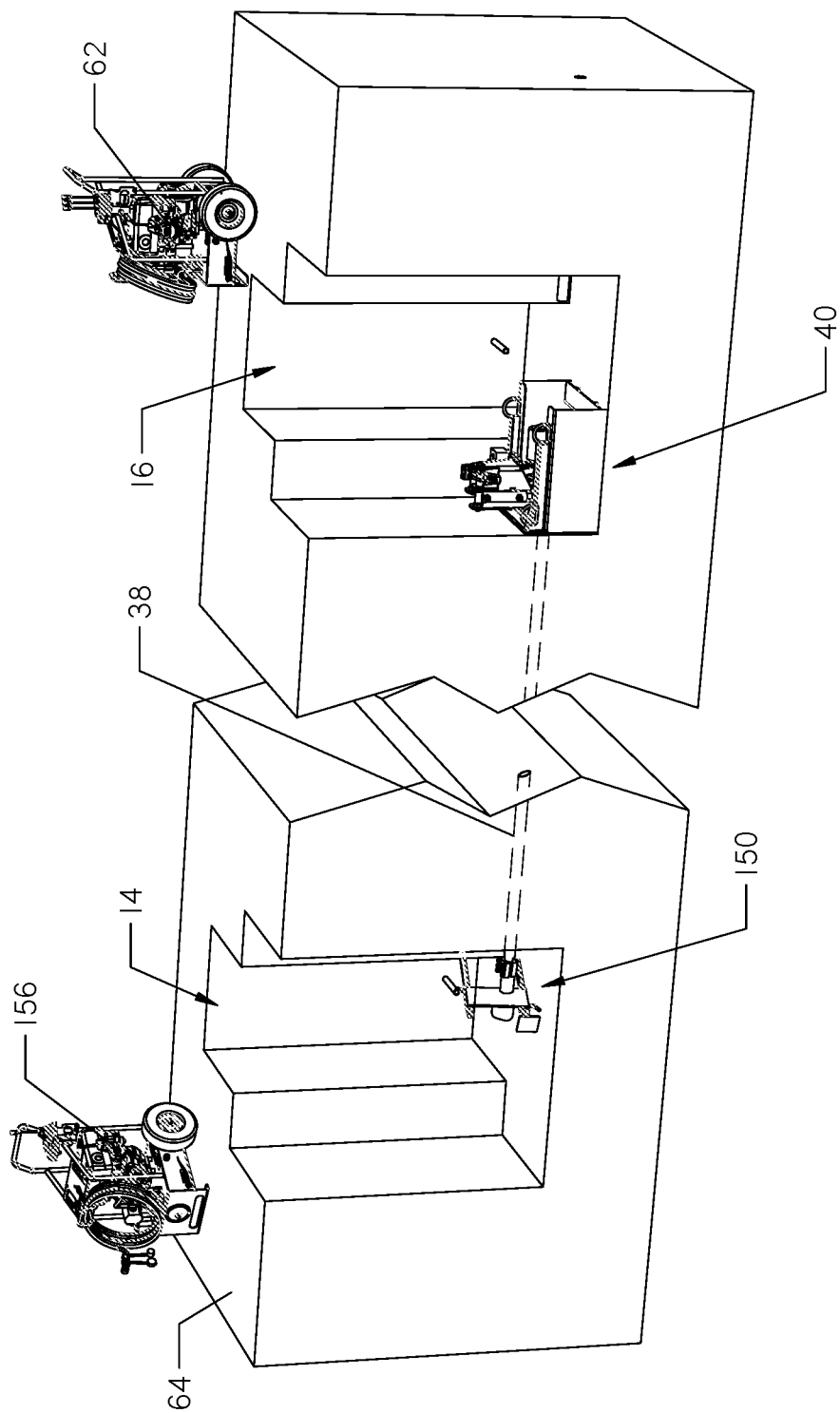
FIG. 9 is the isometric view shown in FIG. 3, but another embodiment of a pipe twisting device is shown engaged with the end of the pipe in the first pit.
Figure 10:
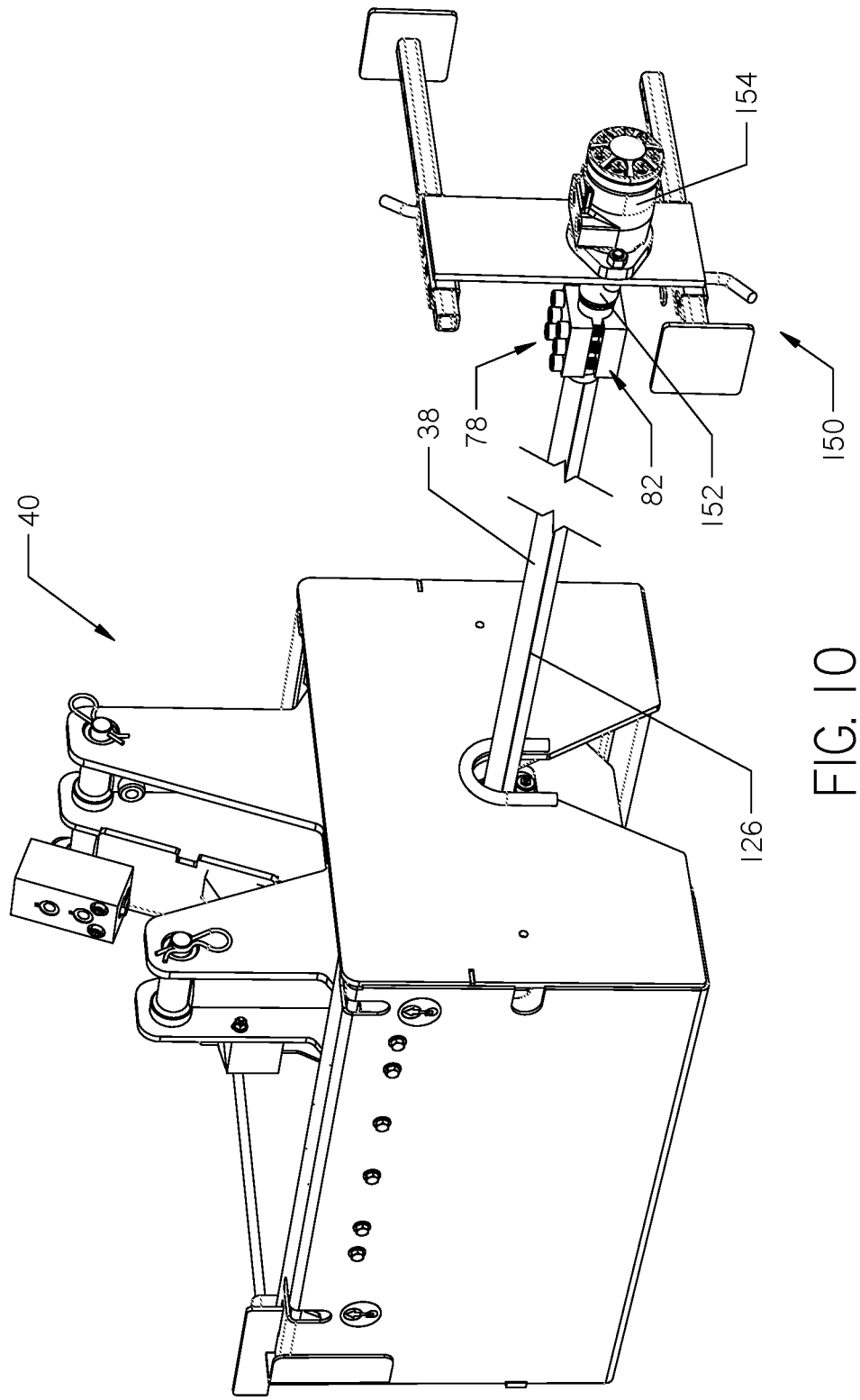
FIG. 10 is a left-side perspective view of the pipe twisting device and pipe extractor shown in FIG. 9, but the soil has been removed. The pipe twisting device and pipe extractor are shown attached to opposite ends of the pipe shown in FIG. 9.
Figure 11:
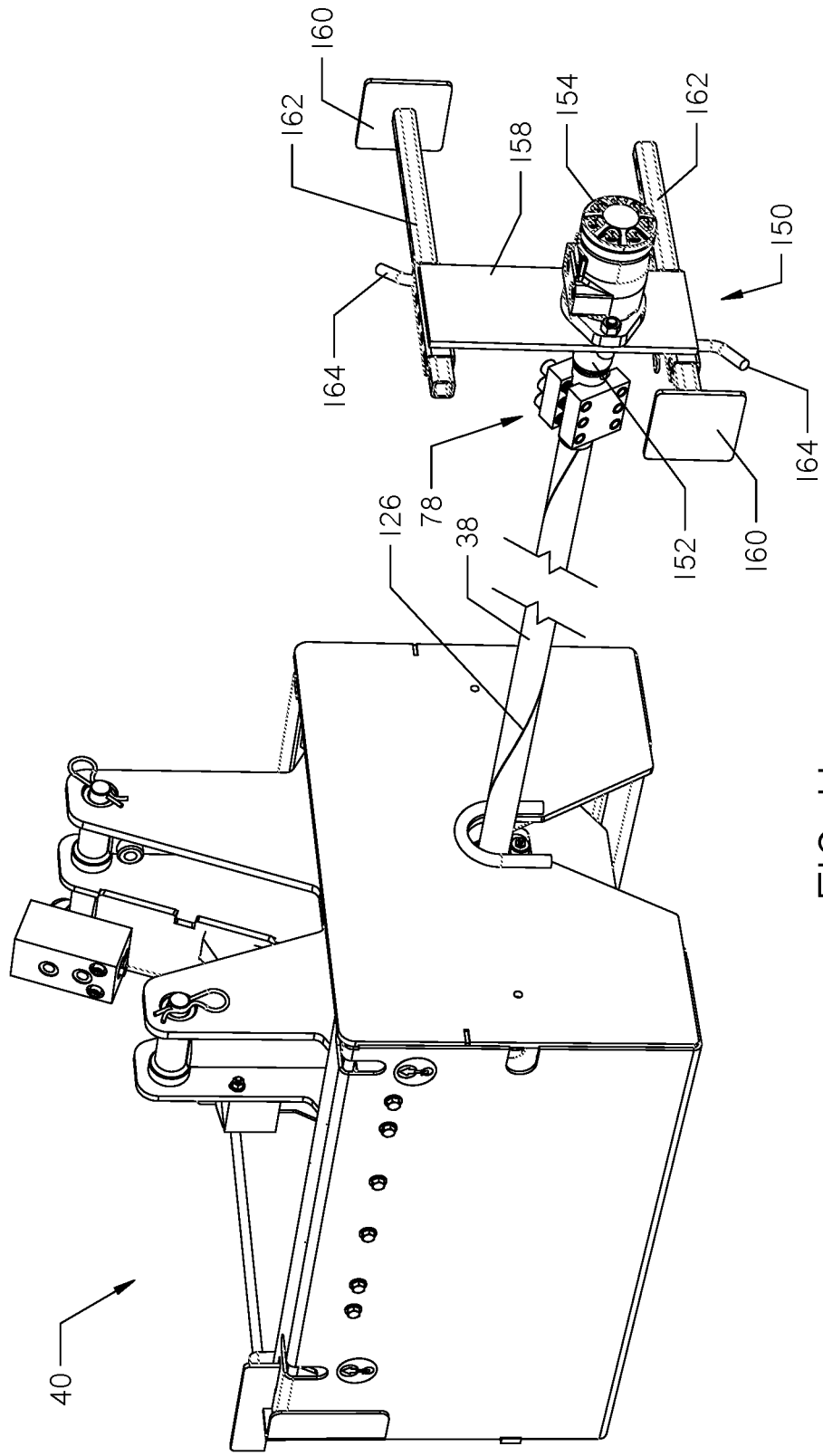
FIG. 11 is the left-side perspective view of the pipe twisting device and pipe extractor shown in FIG. 10, but the pipe is shown in a twisted position.

Turning to FIG. 9, another embodiment of a pipe twisting device 150 is shown. The pipe twisting device 150 is supported on the first free end 26 of the pipe section 38 via the pipe adapter 78. The pipe twisting device 150, as shown in more detail in FIGS. 10 and 11, comprises a coupler 152 in gripping engagement with the drive pin 80. The coupler 152 may comprise a chuck or other gripping means known in the art. The coupler 152 is mechanically coupled to a motor 154. The motor 154 shown in FIGS. 9-11 is a hydraulic motor. The motor 154 is powered by a hydraulic power pack 156 situated at the ground surface 64, as shown in FIG. 9. In alternative embodiments, the motor may be powered by other means, such as by electricity or fossil fuels.

When power is supplied to the motor 154, the motor 154 rotates the coupler 152, which in turn applies torsional force to the first free end 26 of the pipe section 38. The torsional force twists and torsionally deforms the pipe section 38, as shown by a comparison of the pipe axis 126 in FIGS. 10 and 11, thereby breaking the skin friction between the pipe section 38 and the soil 12. Like the pipe twisting device the skin friction is broken in consecutive short distances along the length of the pipe section 38 as the pipe section 38 twists.

The motor 154 is supported on a stabilizing frame 158. A pair of reaction feet 160 extend from the frame 158 and are configured to bear against the walls of the first pit 14 during operation. The feet 160 are supported on a corresponding pair of adjustable arms 162. The arms 162 are held in place relative to the frame 158 using shear pins 164. When using the pipe twisting device 150, the cable 60 may be threaded through the pipe section 38 after the pipe section 38 has been torsionally deformed and the initial skin friction broken.

Figure 12:
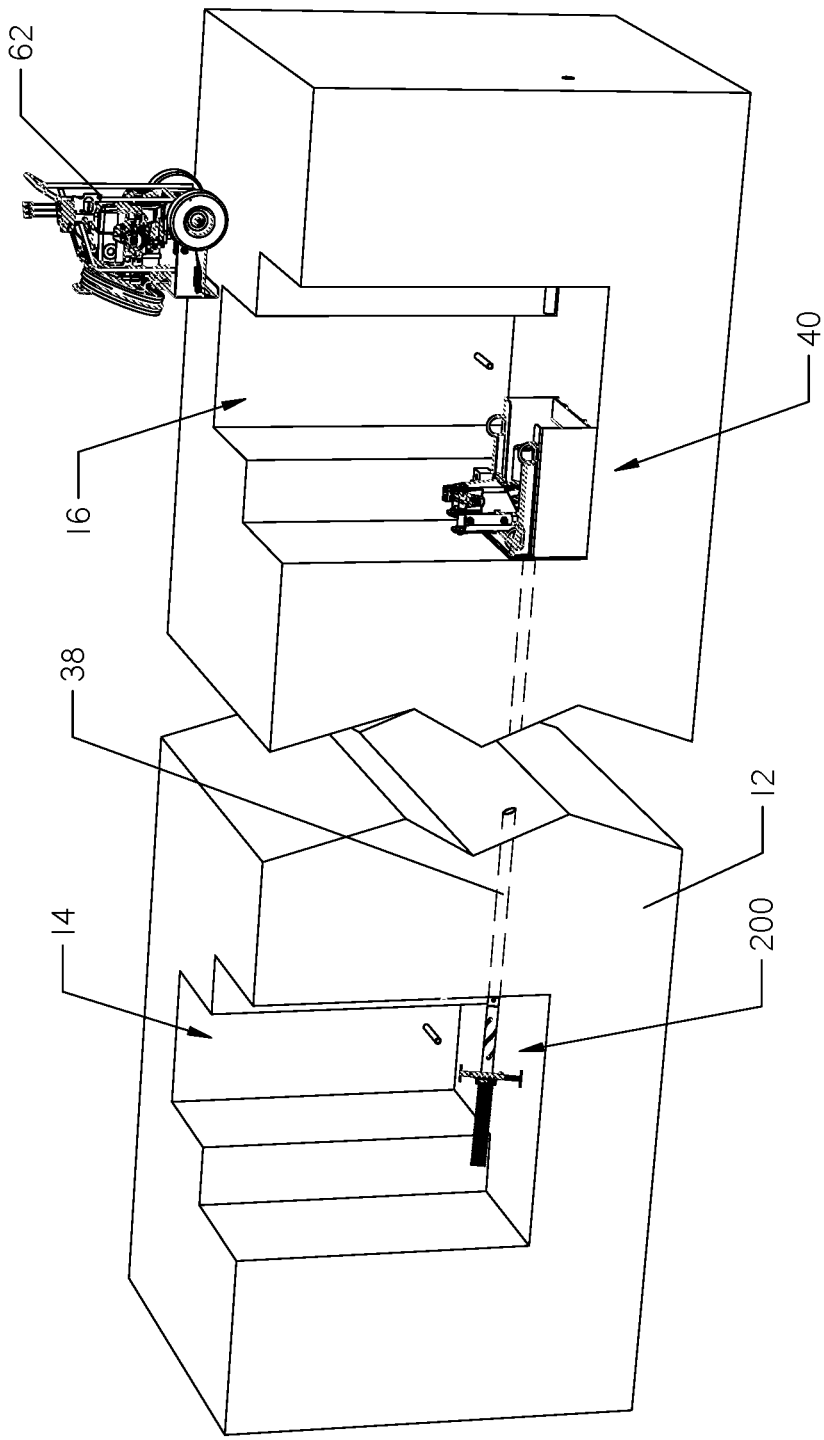
FIG. 12 is the isometric views shown in FIGS. 3 and 9, but another embodiment of a pipe twisting device is shown engaged with the end of the pipe in the first pit.
Figure 14:
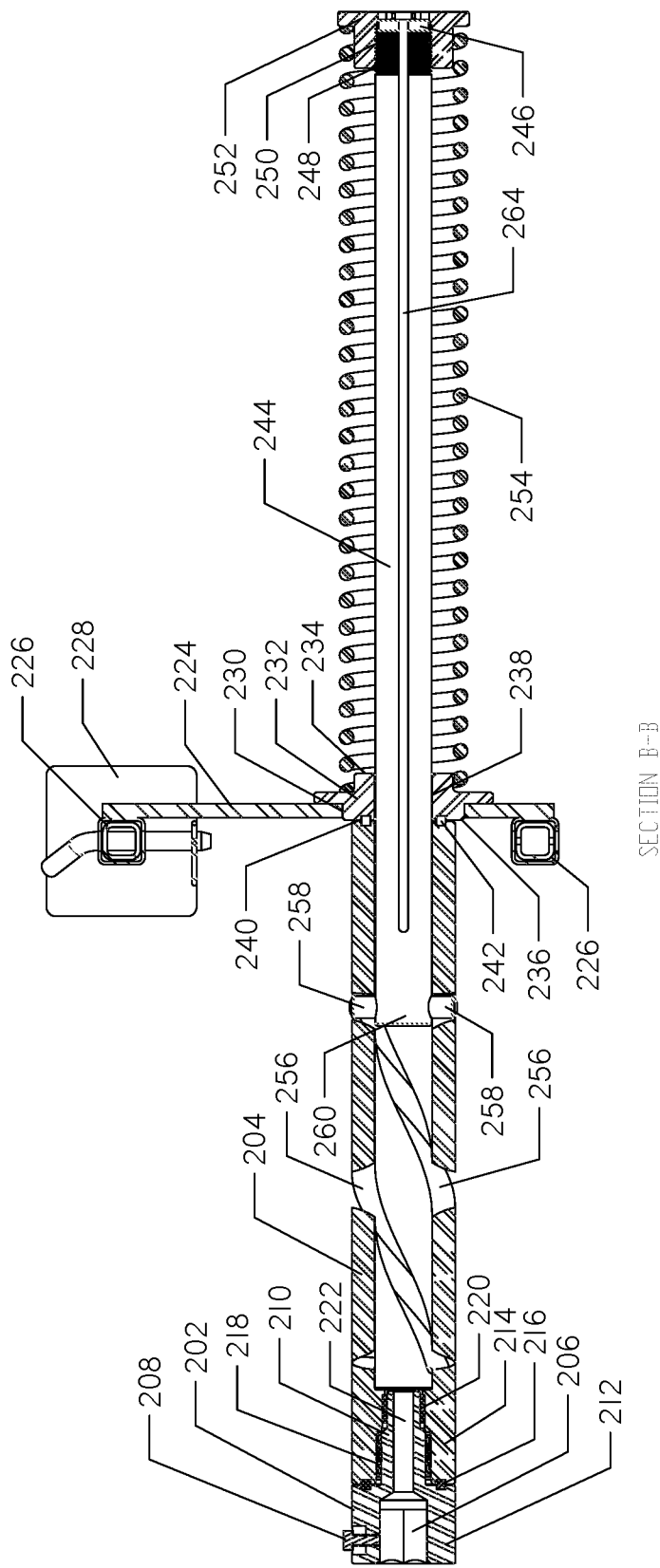
FIG. 14 is a cross-sectional view of the pipe twisting device shown in FIG. 13, taken along line B-B.

With reference to FIG. 12, another embodiment of a pipe twisting device 200 is shown. The pipe twisting device 200, as shown in more detail in FIGS. 13 and 14, comprises a ratchet housing 202 joined to a reaction tube 204. A coupler 206 is formed in the interior of the ratchet housing 202 and is configured to grippingly engage the drive pin 80. The coupler 206 shown in FIG. 14 is a female hex. In alternative embodiments, the coupler may comprise threads or other coupling means known in the art. When the coupler 206 is engaged with the drive pin 80, a bolt 208 or other fastener, may be installed through the ratchet housing 202 and the coupler 206 and engage the coupler 92 on the drive pin 80. The bolt 208 helps ensure a rigid connection between the joined couplers 206 and 92.

Continuing with FIG. 14, the ratchet housing 202 further comprises a first end 210 joined to a second end 212. The first end 210 is configured to be disposed within a second end 214 of the reaction tube 204. An outer surface of the first end 210 of the ratchet housing 202 corresponds with the shape of an inner surface of the second end 214 of the reaction tube 204. When the ratchet housing 202 is installed within the reaction tube 204, an outer surface of the second end 212 of the ratchet housing 202 abuts and aligns with an outer surface of the second end 214 of the reaction tube 204. A face bushing 216 may be positioned between the abutting surfaces of the ratchet housing 202 and the reaction tube 204.

A ratchet mechanism 218 is disposed between the outer surface of the first end 210 of the ratchet housing 202 and the inner surface of the reaction tube 204. The ratchet mechanism 218 allows for one-way rotation of the reaction tube 204 about the ratchet housing 202. A bushing 220 may also be disposed between the outer surface of the first end 210 of the ratchet housing 202 and the inner surface of the reaction tube 204 adjacent to the ratchet mechanism 218. A passage 222 is formed in the interior of the first end 210 of the ratchet housing 202 that interconnects the coupler 206 and an interior of the reaction tube 204.

Continuing with FIGS. 13 and 14, the pipe twisting device 200 further comprises a stabilizing frame 224. The stabilizing frame 224 comprises adjustable arms 226 that each support a reaction foot 228. The feet 228 bear against the walls of the first pit 14 during operation. A central opening 230 is formed within the center of the stabilizing frame 224. A rear flange 232 is supported within the central opening 230 and has opposed first and second surfaces 234 and 236 interconnected by a central opening 238. A first end 240 of the reaction tube 202 is attached to the second surface 236 of the rear flange 232 such that the interior of the reaction tube 204 aligns with the central opening 238 of the rear flange 232. A face bushing 242 may be disposed between the first end 240 of the reaction tube 204 and the rear flange 232.

The pipe twisting device 200 further comprises a shaft 244 disposed within the reaction tube 204 and the central opening 238 of the rear flange 232. A first end 246 of the shaft 244 projects from the first surface 234 of the rear flange 232. External threads 248 are formed on the first end 246 of the shaft 244 and are configured to mate with internal threads 250 formed on a front flange 252. A spring 254 is disposed around the shaft 244 and engages the rear and front flanges 232 and 252 at its opposed ends.

Continuing with FIGS. 13 and 14, a helical slot 256 is formed in the reaction tube 204 along its length. The slot 256 interconnects opposed inner and outer surfaces of the reaction tube 204. At least one pin 258 is attached to a second end 260 of the shaft 244 and is disposed within the helical slot 256. Two pins 258 are shown in FIG. 14. The shaft 244 is configured to move axially within the reaction tube 204. The pins 258 are configured to travel through the helical slot 256 as the shaft 244 moves axially within the tube 204.

Figure 15:
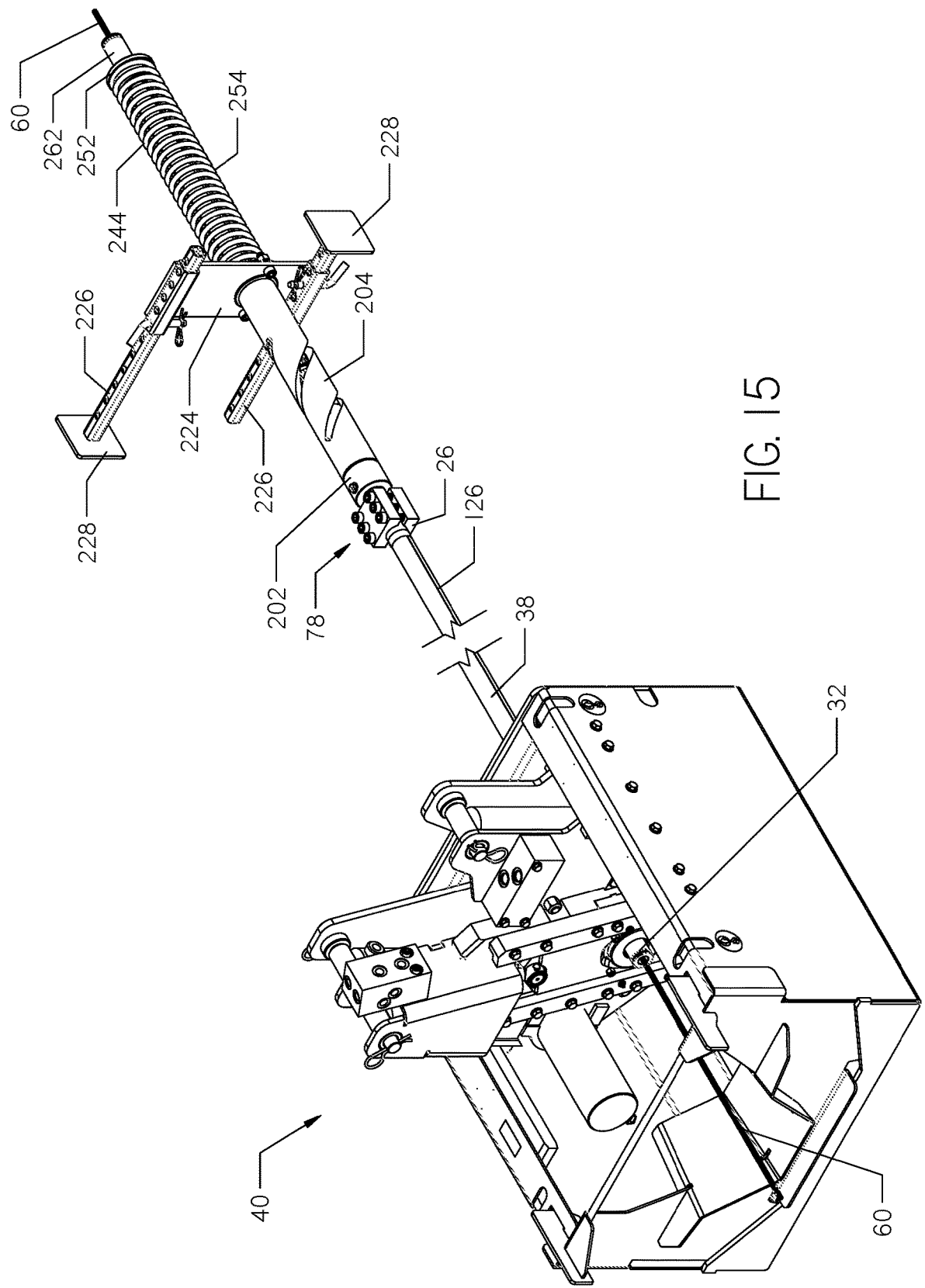
FIG. 15 is a left-side perspective view of the pipe twisting device and pipe extractor shown in FIG. 12, but the soil has been removed. The pipe twisting device and pipe extractor shown attached to opposite ends of the pipe shown in FIG. 12.
Figure 16:
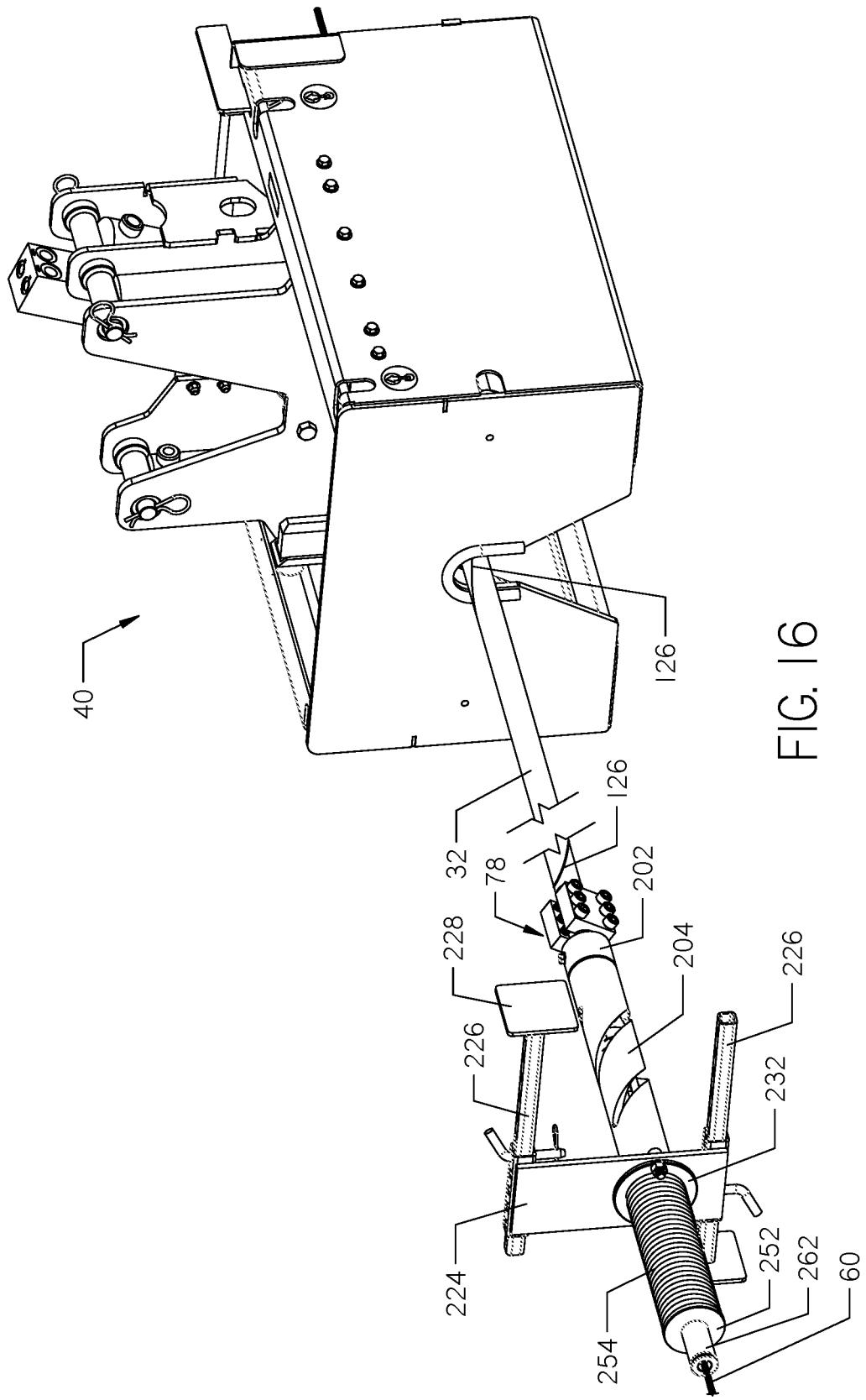
FIG. 16 is a right-side perspective view of the pipe twisting device and pipe extractor shown in FIG. 15, but the pipe is shown in a twisted position.

Turning to FIGS. 15 and 16, a cable 60 is threaded through the pipe section 38, the drive pin 80, and the pipe twisting device 200. The cable 60 passes through the ratchet housing 202, the reaction tube 204, and the shaft 244 and exits the pipe twisting device 200 through the front flange 252. A coupler 262 may be secured to the cable 60 and engaged with the front flange 252, such that the cable 60 is held taut within the pipe section 38 and pipe twisting device 200. The coupler 262 may comprise a chuck or other gripping means known in the art. An opposed end of the cable 60 is gripped by the pipe extractor 40.

Continuing with FIGS. 13-16, in operation, the pipe extractor 40 pulls rearwardly on the cable 60. Rearward movement of the cable 60 causes the coupler 262 to apply a rearward axial force on the front flange 252, the shaft 244, and the spring 254. Such force causes the spring 254 to compress against the rear flange 232 and moves the shaft axially in a rearward direction within the reaction tube 204. As the shaft 244 moves rearwardly within the reaction tube 204, the pins 258 bear against the walls surrounding the helical slot 256, causing the reaction tube 204 to rotate. Rotation of the reaction tube 204 applies a torsional force to the ratchet housing 202 and the drive pin and thereby the pipe section 38. Thus, rotation of the ratchet housing 202 twists and torsionally deforms the pipe section 38, as shown by a comparison of the pipe axis 126 in FIGS. 15 and 16.

Because the reaction tube 204 is joined to the ratchet housing 202 by a ratchet mechanism 218, the ratchet housing 202 and reaction tube 204 rotate together in a first direction. However, only the reaction tube 204 can rotate in an opposed second direction. Once the spring 254 is fully compressed, as shown in FIG. 16, the pipe extractor 40 releases tension on the cable 60, allowing the spring 254 to expand and pull the shaft 244 axially forward out of the reaction tube 204. Such movement causes the pins 258 to travel through the helical slot 256, causing the reaction tube 204 to rotate in a reverse direction relative to the ratchet housing 202. As the reaction tube 204 rotates, the ratchet housing 202 remains stationary and continues to apply torsional force to the pipe section 38.

Continuing with FIG. 14, a pair of elongate slots 264 are formed on opposite sides of the shaft 244. The slots 264 are configured to receive one or more keys (not shown) attached to the rear flange 232. The keys slide through the slots 264 as the shaft 244 moves axially and prevent the shaft 244 from rotating relative to the reaction tube 204. Thereby, ensuring that the force between the pins 258 and the reaction tube 204 causes the reaction tube 204 to rotate.

Once the spring 254 is fully expanded, the pipe extractor 40 again pulls rearwardly on the cable 60 compressing the spring 254 a second time. The shaft 244 moves rearwardly within the reaction tube 204, causing the reaction tube 204 and the ratchet housing 202 to rotate together in a first direction. Such rotation further twists the pipe section 38. Tension on the cable 60 is then released, allowing the spring 254 to again expand and pull the shaft 244 forward out of the reaction tube 204. Such process is repeated as many times as needed until the skin friction is broken along the entire length of the pipe section 38. Like the pipe twisting devices 70 and 150, the skin friction is broken in consecutive short distances along the length of the pipe section 38 as the pipe section 38 twists.

Figure 17:
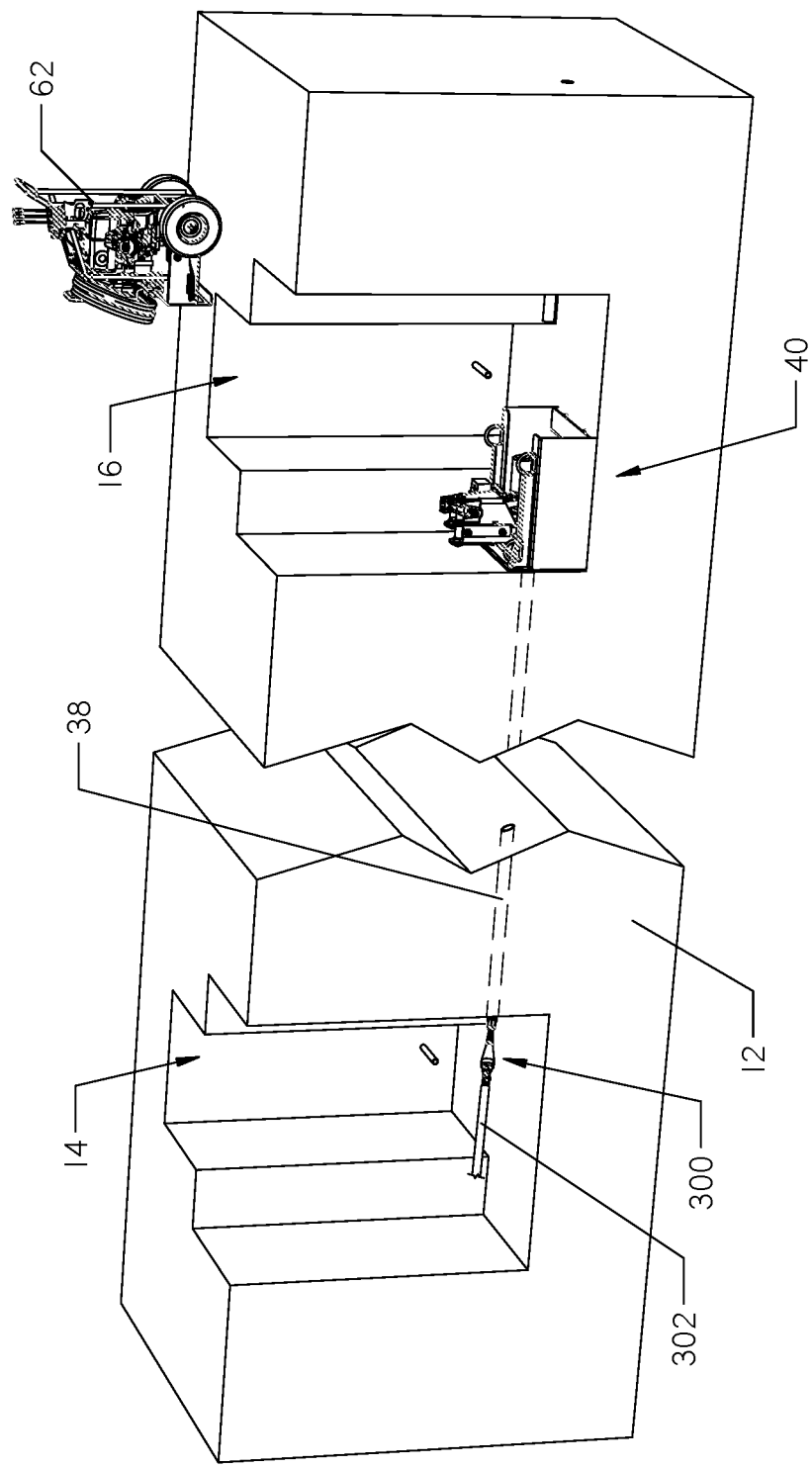
FIG. 17 is the isometric views shown in FIGS. 3, 9, and 11, but a new pipe is shown attached to the end of the pipe in the first pit.
Figure 18:
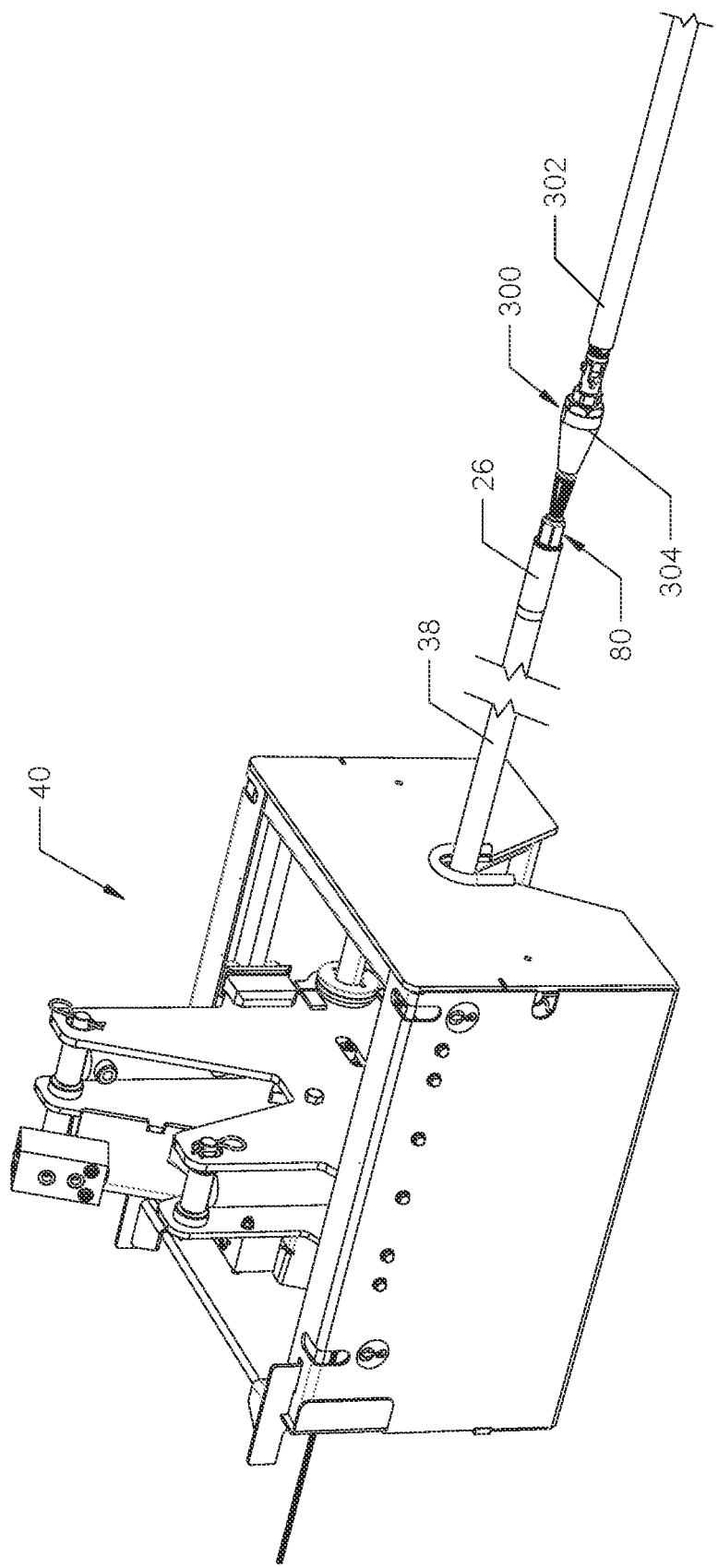
FIG. 18 is a left-side perspective view of the new pipe and pipe extractor shown in FIG. 17, but the soil has been removed. The new pipe and pipe extractor are shown attached to opposite ends of the pipe shown in FIG. 17.

With reference to FIGS. 17 and 18, after the skin friction is broken along the entire length of the pipe section 38, the pipe twisting device 70, 150, or 200 is removed from the first free end 26 of the pipe section 38. A pipe pulling device 300 is then attached to an end of the cable 60 and engaged with the drive pin 80, and a new pipe section 302 is attached to the pipe pulling device 300. In operation, the pipe extractor 40 pulls the new pipe section 302 into the soil 12 as the pipe section 38 is pulled out of the soil 12. The clamp 82 may be removed from the first free end 26 prior to pulling the new pipe 302 into the soil. The pipe pulling device 300 may comprise a conical section 304 configured to help expand the size of the borehole as it moves through the soil 12, making it easier for the new pipe 302 to be installed.

In operation, the pipe section 38 may remain in a twisted or deformed state as it is pulled from the soil 12. However, such torsional deformation of the pipe section 38 is limited from radial movement by the surrounding soil and will maintain the path of the original borehole, and therefore does not limit the ability of the pipe extractor 40 to extract the pipe section 38 from the soil 12 in its traditional manner.

In alternative embodiments, the pipe adapter 78 may only comprise the drive pin 80 or may only comprise the clamp 82. If the pipe adapter 78 only comprises the clamp 82, the clamp 82 may be configured so as to clamp onto the pipe section 38 as well as a coupler included in the pipe twisting device 70, 150, or 200. In further alternative embodiments, other sizes, shapes, or configurations, of pipe adapters may be used as long as the adapter places the pipe twisting device in gripping engagement with an end of the pipe section 38.

In further alternative embodiments, the pipe twisting device 70, 150, or 200 may be attached to the second free end 32 of the pipe section 38 within the second pit 16. The pipe twisting device 70, 150, or 200 may torsionally deform the pipe section 38 and then be removed and replaced with an apparatus configured to pull the pipe section 38 from the soil 12. In such case, if the pipe twisting device 200 is used, the spring 254 may be compressed without the use of the cable 60. Rather, the spring 254 may be compressed by manually pushing on the front flange 252, for example.

The pipe twisting devices 70, 150, and 200 described herein are just a few examples of devices that may be used to twist and torsional deform the pipe section 38. Other designs, configurations, or embodiments may be used as long as the device is configured to twist and torsionally deform an already existing product pipeline.

The pipe twisting devices contemplated herein are not horizontal directional drills known in the art. Such drills are configured to thrust and rotate a drill string to create a borehole. Such drills are not configured to torsional deform an existing product pipeline. The existing product pipeline contemplated herein is not a drill string made of individual pipe segments threaded together. Rather, the existing product pipeline is a continuous line of pipe configured to transport products, such as water, gas, or waste between two points.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A system, comprising:
   an existing product pipeline having a first end, a second end, and a middle section, in which the middle section is below ground and the first and second ends are exposed to an above-ground environment; and
   a pipe twisting device comprising a wrench comprising at least one handle, the wrench in gripping engagement with the first end of the product pipeline and configured to apply a torsional force to the product pipeline such that at least a portion of the product pipeline is torsionally deformed.

2. The system of claim 1, in which the middle section is surrounded by an earth material, and in which the earth material is in gripping engagement with the middle section of the product pipeline.

3. The system of claim 1, further comprising:
   an apparatus in gripping engagement with the second end of the product pipeline and configured to apply an axial force to the product pipeline.

4. The system of claim 3, in which the apparatus comprises:
   a stationary support structure having a longitudinal axis;
   a carriage movable relative to the stationary support structure along the longitudinal axis; and
   a pipe clamp assembly supported by the carriage and in gripping engagement with the second end of the pipe.

5. The system of claim 1, further comprising:
an apparatus configured to grip a selected first or second end of the product pipeline and configured to apply an axial force to the product pipeline.

6. A method of using the system of claim 5, the method comprising:
applying a torsional force to the product pipeline with the pipe twisting device until at least a portion of the product pipeline is torsionally deformed;
thereafter, removing the pipe twisting device from the first end of the product pipeline and gripping the first end of the product pipeline with the apparatus; and
thereafter, applying an axial force to the product pipeline using the apparatus.

7. The system of claim 1, further comprising:
a drive pin disposed within the first end of the product pipeline and having an end in gripping engagement with the pipe twisting device.

8. The system of claim 1, further comprising:
a clamp secured to the first end of the product pipeline, in which the pipe twisting device is in gripping engagement with the clamp.

9. A method of using the system of claim 1, comprising:
applying force to the at least one handle of the wrench such that the handle rotates about a central longitudinal axis of the pipe.

10. The system of claim 1, which the first end is situated within a below ground first pit, and in which the second end is situated within a below ground second pit; and in which at least a portion of the pipe twisting device is situated within the first pit.

11. The system of claim 1, further comprising:
a new product pipeline configured to replace the existing product pipeline.

12. A system, comprising:
an existing product pipeline having a first end, a second end, and a middle section, in which the middle section is below ground and the first and second ends are exposed to an above-ground environment; and
a pipe twisting device supported at the first end of the product pipeline and configured to apply a torsional force to the product pipeline such that at least a portion of the product pipeline is torsionally deformed;
in which an outer surface of the product pipeline has a longitudinal pipe axis; and in which the pipe twisting device is configured to torsionally deform the product pipeline such that at least a portion of the longitudinal pipe axis has a helical shape after torsional force is applied to the product pipeline.

13. The system of claim 12, in which the pipe twisting device comprises:
a coupler in gripping engagement with the first end of the pipe; and
a motor mechanically coupled to the coupler.

14. A method of using the system of claim 13, comprising:
supplying power to the motor such that the motor rotates the coupler.

15. The system of claim 12, in which the pipe twisting device comprises:
a coupler in gripping engagement with the first end of the pipe;
a reaction tube attached to the coupler and having a helical slot formed along a length of the tube;
at least one pin disposed within the helical slot;
an elongate shaft disposed within the tube and attached to the at least one pin; and
a spring attached to the shaft.

16. A method of using the system of claim 15, comprising:
applying a compressive force to the spring.

17. A method of extracting at least a portion of a pipe from an underground environment, comprising:
isolating an elongate segment of the pipe, the segment situated predominately underground and having a first end exposed to the above-ground environment at a first site, and a second end exposed to the above-ground environment at a second site;
at the first site, applying a torsional force to the isolated segment of the pipe; and
after or during the foregoing step and at the second site, applying longitudinal force to the isolated segment of the pipe until the extent of the exposure of the isolated segment of the pipe to the above-ground environment is increased.

18. The method of claim 17, further comprising:
torsionally deforming the isolated segment of the pipe in response to the application of torsional force.

19. The method of claim 17, further comprising:
at the second site, removing the isolated segment of pipe from the underground environment; and
at the first site, pulling a new elongate segment of pipe into the underground environment.

\* \* \* \* \*

UNITED STATES PATENT AND TRADEMARK OFFICE
CERTIFICATE OF CORRECTION

PATENT NO. : 11,913,570 B1
APPLICATION NO. : 17/335297
DATED : February 27, 2024
INVENTOR(S) : Wentworth et al.

It is certified that error appears in the above-identified patent and that said Letters Patent is hereby corrected as shown below:

In the Specification

Column 6, Line 23, please delete "no" and substitute therefor "110".

Signed and Sealed this
Twenty-sixth Day of March, 2024

*Katherine Kelly Vidal*
Katherine Kelly Vidal
*Director of the United States Patent and Trademark Office*